United States Patent
Spry

(10) Patent No.: US 9,796,572 B2
(45) Date of Patent: Oct. 24, 2017

(54) ADJUSTABLE SUPPORT FITTINGS FOR A JIMMY BAR AND OTHER ELONGATED STRUCTURES

(71) Applicant: CSE Holding Company, Inc., Williston, VT (US)

(72) Inventor: Johnathan K. Spry, St. Albans, VT (US)

(73) Assignee: CSE Holding Company, Inc., Williston, VT (US)

(*) Notice: Subject to any disclaimer, the term of this patent is extended or adjusted under 35 U.S.C. 154(b) by 0 days.

(21) Appl. No.: 14/858,649

(22) Filed: Sep. 18, 2015

(65) Prior Publication Data

US 2016/0083234 A1  Mar. 24, 2016

Related U.S. Application Data

(60) Provisional application No. 62/053,147, filed on Sep. 20, 2014.

(51) Int. Cl.
*F16B 1/00* (2006.01)
*B66F 15/00* (2006.01)
*F16B 2/06* (2006.01)

(52) U.S. Cl.
CPC ............... *B66F 15/00* (2013.01); *F16B 1/00* (2013.01); *F16B 2/065* (2013.01)

(58) Field of Classification Search
CPC .................................. F16B 2/065; B66F 15/00
See application file for complete search history.

(56) References Cited

U.S. PATENT DOCUMENTS

| 119,770 A | * | 10/1871 | Ives | ................... | B25C 11/00 |
| | | | | | 254/25 |
| 180,117 A | * | 7/1876 | Cubberley | ............ | B23B 31/202 |
| | | | | | 279/42 |

(Continued)

FOREIGN PATENT DOCUMENTS

| CN | 201292612 | 8/2009 |
| DE | 1475764 | 3/1969 |

(Continued)

OTHER PUBLICATIONS

Apex Tool Group, Crescent DB16 16-inch Adjustable Pry Bar, Nail Puller, Red/Black; www.amazon.com; Aug. 28, 2015.

(Continued)

*Primary Examiner* — Larry E Waggle, Jr.
*Assistant Examiner* — Tyrone V Hall, Jr.
(74) *Attorney, Agent, or Firm* — Downs Rachlin Martin PLLC

(57) ABSTRACT

Adjustable clamp systems that include friction sleeves and corresponding compression nuts for securing the friction sleeves to an elongated support structure. Each friction sleeve is designed and configured to slidably engage around the exterior of the elongated support structure and includes at least one deformable region that allows the corresponding compression nut to radially compress a portion of the friction sleeve into firm engagement with the support structure so that the friction sleeve firmly grips the support structure. The adjustable clamp systems can be used to secure one or more objects to the elongated support structure.

20 Claims, 7 Drawing Sheets

(56) References Cited

U.S. PATENT DOCUMENTS

| | | | | |
|---|---|---|---|---|
| 453,622 | A * | 6/1891 | Cheney | B23B 31/202 |
| | | | | 279/42 |
| 753,241 | A * | 3/1904 | Davidson | B23B 31/202 |
| | | | | 279/42 |
| 761,501 | A * | 5/1904 | Kimball et al. | B23B 31/202 |
| | | | | 279/103 |
| 1,806,687 | A * | 5/1931 | Hoover | E04G 7/20 |
| | | | | 403/312 |
| 3,380,097 | A * | 4/1968 | Pharris | B05C 17/0205 |
| | | | | 15/145 |
| 3,744,758 | A * | 7/1973 | Nakasone | B65G 7/12 |
| | | | | 254/129 |
| 3,850,535 | A * | 11/1974 | Howlett | E04C 5/165 |
| | | | | 403/305 |
| 4,025,093 | A | 5/1977 | Leczycki | |
| 4,298,222 | A | 11/1981 | Davies | |
| 4,509,242 | A | 4/1985 | Marra | |
| 4,524,484 | A * | 6/1985 | Graham | A45B 9/00 |
| | | | | 15/144.4 |
| 4,530,523 | A * | 7/1985 | Proni | F16L 19/06 |
| | | | | 285/179 |
| 4,799,717 | A | 1/1989 | Kingsford | |
| 4,848,953 | A * | 7/1989 | Young | B25B 5/147 |
| | | | | 403/290 |
| 5,037,235 | A * | 8/1991 | Aquilina | B25G 1/04 |
| | | | | 16/427 |
| 5,193,932 | A * | 3/1993 | Wu | E04C 5/165 |
| | | | | 403/307 |
| 5,595,541 | A | 1/1997 | Ducugnon | |
| 5,887,314 | A * | 3/1999 | Jordan, Jr. | A47L 13/12 |
| | | | | 15/144.3 |
| 2001/0016143 | A1 * | 8/2001 | Plooksawasdi | E04C 5/165 |
| | | | | 403/1 |
| 2007/0175167 | A1 * | 8/2007 | Allen | E04C 5/165 |
| | | | | 403/307 |
| 2009/0045624 | A1 | 2/2009 | Nakata et al. | |
| 2009/0232588 | A1 * | 9/2009 | Goh | F16B 2/065 |
| | | | | 403/44 |

FOREIGN PATENT DOCUMENTS

| | | |
|---|---|---|
| EP | 1205671 A1 | 5/2002 |
| GB | 2072780 | 10/1981 |
| GB | 2421554 | 6/2006 |
| WO | 2015089886 | 6/2015 |

OTHER PUBLICATIONS

Truck Spring, Collet Compression Sleeve—1/8 inch tubing; www.truckspring.com; Aug. 27, 2015.

* cited by examiner

ADJUSTABLE SUPPORT FITTINGS FOR A JIMMY BAR AND OTHER ELONGATED STRUCTURES

FIELD OF THE INVENTION

This application claims the benefit of priority of U.S. Provisional Patent Application Ser. No. 62/053,147 filed on Sep. 20, 2014 and titled "ADJUSTABLE ACCESSORY SUPPORT FITTINGS FOR A JIMMY BAR OR OTHER ELONGATED STRUCTURE", which is incorporated herein by reference in its entirety.

FIELD OF THE INVENTION

The present invention generally relates to the field of structural support. In particular, the present invention is directed to an adjustable support fittings for a jimmy bar and other elongated structures.

BACKGROUND

Jimmy bars are commonly used by ironworkers to push and pry steel building members into place and align holes in the members so that they can be bolted together. Jimmy bars, no matter the size or length, are typically straight steel bars with a point on one end while the other end is flat and slightly curved. Because of the straight, smooth shape of these bars, it is necessary to add a washer to them in order for them to stay in place when sheathed in a scabbard or pouch. The washers also can be used as a fulcrum point when maneuvering pieces into place. Most methods of adding the washer leave it stationary, as it would be too time consuming to move it.

SUMMARY

In one implementation, the present disclosure is directed to an adjustable clamp system for securing an object to an elongated structure. The adjustable clamp includes a first friction sleeve having a first longitudinal axis and including a first passageway sized to receive the elongated structure so that the first friction sleeve is slidable along the elongated structure; and a first deformable region designed and configured to deform so as to allow the first friction sleeve to firmly frictionally engage the elongated structure when the adjustable clamp system is in use; a first compression nut designed and configured to engage the first friction sleeve so as to deform the first deformable region so that the first friction sleeve firmly frictionally engages the elongated structure when the adjustable clamp system is in use; a first clamping face designed and configured to engage the object when the adjustable clamp system is in use; and a second clamping face designed, configured, and located so that, when the adjustable clamp system is in use, the second clamping face is opposed to the first clamping face and the object is clamped therebetween.

In another implementation, the present disclosure is directed to a hand tool that includes an elongated portion; an accessory to the hand tool; and the adjustable clamp system of claim 1 engaged with the elongated portion and securing the accessory to the hand tool.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
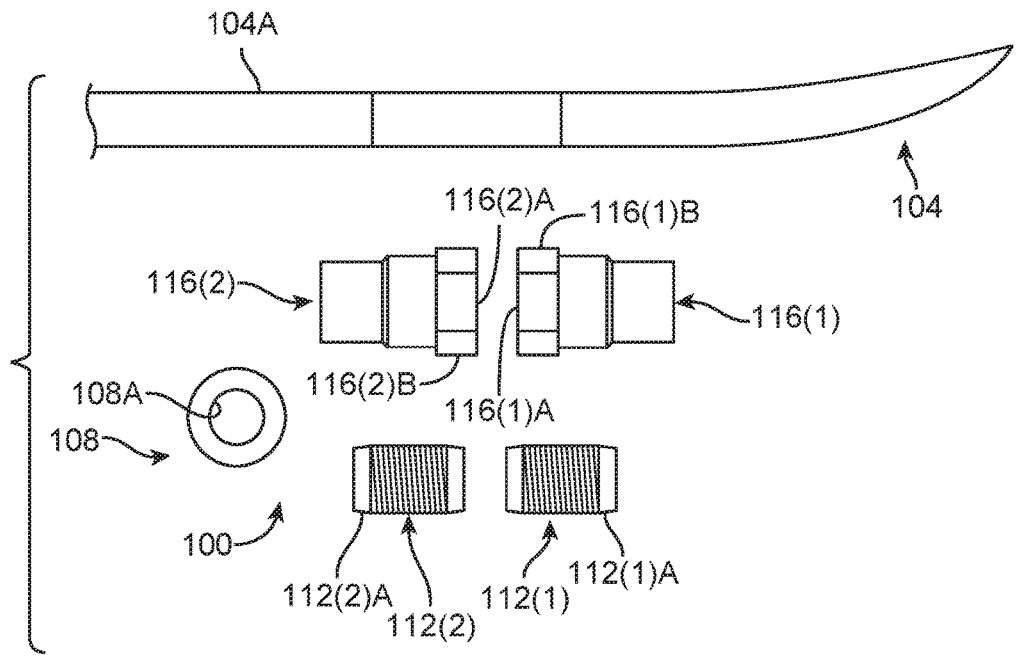
FIGS. 1A to 1F compose a series of views illustrating exemplary steps of securing an accessory member to a steel-working jimmy bar using an adjustable clamp system of the present invention.

In some aspects, the present invention is directed to an adjustable clamping system that allows a user to clamp one or more objects to an elongated structure. As described below in detail, some embodiments of this aspect include one or more friction sleeves each having a passageway designed and configured to conformally engage the elongated structure. Each friction sleeve includes one or more deformable regions that deform under the influence of a compression nut in a manner that causes the friction sleeve to firmly grip the elongated structure so as to inhibit the friction sleeve from moving relative to the elongated structure. The adjustable clamping system also includes one or more compression nuts, typically one for each friction sleeve, each for engaging a corresponding friction sleeve in a manner that deforms the deformable region(s) to radially force one or more portions of the friction sleeve into firm engagement with the supporting structure to provide grip to the friction sleeve.

As will be described below, each compression nut may be engageable with the corresponding friction sleeve in any suitable manner, such as being slidably engageable or threadably engageable with the friction sleeve. As those skilled in the art will readily appreciate, in a slidably engageable embodiment one, the other, or both of the friction sleeve and compression nut may have one or more features on their outer and inner confronting surfaces, respectively, that cause the deformable region(s) on the friction sleeve to increasingly deform as a user more and more firmly engages the compression nut with the friction sleeve. For threadably engageable embodiments, one, the other, or both of the friction sleeve and compression nut may have a tapered threaded region on their outer and inner engaging surfaces, respectively, that cause the deformable region(s) on the friction sleeve to increasingly deform as a user increases the threaded engagement of the compression nut with the friction sleeve. A number of examples of compression nut engagement with a friction sleeve are illustrated in the drawings and described below.

The adjustable clamping system further includes a pair of clamping faces that engage the one or more objects for clamping the object(s) therebetween. In some embodiments, at least one of the clamping faces is located on a compression nut. For an example in which the adjustable clamping system has only one friction sleeve, one of the clamping faces may be on a compression nut, with another clamping face being on a body that includes not only the clamping face, but also the friction sleeve corresponding to the compression nut. As another example in which the adjustable clamping system has a pair of friction sleeves, each of the two compression nuts corresponding respectively to the pair of friction sleeves has its own clamping face. In other embodiments, one or both of the clamping faces are located on the friction sleeve(s), for example, by providing each such friction sleeve with a flange that defines the clamping face. In embodiments having a plurality of friction sleeves, the friction sleeves may be formed in a unitary body or they may be separate from one another. Having separate and distinct friction sleeves can provide benefits of providing more adjustability for accommodating the clamping of objects of a wide variety of sizes.

In some embodiments, each friction sleeve can be provided with one or more friction-enhancing features, such as knurling, teeth, resilient pads, a resilient (e.g., rubberized) coating or other layer or structure (e.g., pad), a slip-resistant coating, etc., and any suitable combination thereof, to increase the slip-resistance of the grip resulting from the deformation of the deformable region(s) of the friction sleeve(s). Similarly, the engaged surface(s) of the elongated structure may likewise or alternatively be provided with one or more friction-enhancing features to increase the amount of friction generated between the friction sleeve and supporting structure by the compression nut compressing the friction sleeve against the supporting structure. Such friction enhancers may be the same as or different from the friction enhancers for the friction sleeve. Depending on the application, the components of an adjustable clamping system of the present invention can be made of any suitable material(s). For example, in some embodiments, all components may be essentially all metal, while in other embodiments all components may be made of a polymer or composite, while in still other embodiments, some components may be made of metal and others made of a polymer or composite.

Those reasonably skilled in the art will readily appreciate that an adjustable clamping system of the present invention can be adapted to a wide variety of applications, from clamping fulcrum members to shafts of hand tools, such as jimmy bars, to providing clamps or other object supports for fixed horizontal elongated structures (e.g., rods, tubes, pipes, bars of virtually any transverse cross-sectional shape), to providing clamps or other object supports for fixed vertical elongate structures (e.g., rods, tubes, pipes, bars of virtually any transverse cross-sectional shape). Exemplary embodiments and instantiations are described below. However, these should not be taken as limiting in any way; rather they are merely exemplary. Indeed, based on the descriptions and examples herein, those reasonably skilled in the art will readily understand how to configure an adjustable clamping system of the present invention to any of a vast array of applications.

An adjustable clamping system of the present disclosure can be used for organizing and decorating, especially in settings where someone wants to add dividers or supports without the need for a welding machine. Some of the benefits to using an adjustable clamping system of the present disclosure in these applications is they can be easily moved later if needed and because there is no heat they can be painted and used right after application.

An adjustable clamping system of the present disclosure can also be used to organize and decorate many things in a wide array of venues such as shops, warehouses, garages, greenhouses, and can be especially useful for someone, for example as a vendor at a flea market, who wants to set up and take structures, such as shelving, tables, display racks, etc., down quickly while utilizing available space. By attaching adjustable clamping systems at multiple points down the length of a bar, shaft, or pipe horizontally, they make excellent dividers for organizing things such as power cords, welding leads, straps, chokers, ropes, chains, chain falls, and many other things that need to be separated by size and capacity. Two benefits of using adjustable clamping systems for this application is they can be moved to provide more or less space as needed in a matter of seconds and almost any material such as washers, sheet metal, or even an old worn out saw blade can be clamped in place to help keep equipment separated and provide a larger area for marking and labeling for quick reference.

Another way of using an adjustable clamping system of the present disclosure to organize and/or save space is to arrange them along a bar, shaft, or pipe as mentioned before but in a vertical manner instead of horizontal. By arranging adjustable clamping systems vertically, perhaps with washers to form wider bearing surfaces, they can be used to support many different materials such as buckets, planks of wood or anything else the user may wish to use to form the storage bins or shelving they want to construct. A user may simply drill holes in the four corners of a piece of wood the same size as the pipe intended to be used for the supports, attach adjustable clamping systems of the present disclosure to the pieces of pipe being used for the supports, and slide the pipe through the holes in the wood being used for the shelving. Now that the shelf is resting on the compression fittings at all four corners, all that is left is to level the shelf and tighten the compression fittings. By using adjustable clamping systems of the present disclosure in this way the user can construct shelving that is fully adjustable in any size and configuration desired, even on uneven ground. This type of arrangement would be especially useful for anyone who needs to set up temporary shelving for storage or displays and could be taken apart quickly and easily, taking very little space to store or transport. It is noted that the support members, for example, pipes mentioned above for shelving units, do not need to be cylindrical. Rather, virtually any cross-sectional shape can be accommodated by suitably adjusting the shape of the opening of the friction sleeve that receives the support member. For example, for a square tube support member (see, e.g., FIG. 3 described below), the opening in the friction sleeve could be square to match the square cross-sectional shape of the square tube, and the friction sleeve provided with, for example, a partial length slot at each corner to allow the remaining portions of the friction sleeve to deform so that they press against the flat faces of the tube when the compression nut is tightened. Of course, the exterior threaded portion of the friction sleeve may remain cylindrical, frusto-conical, etc., to effect the radial compression applied by the compression nut. If needed, the friction sleeve may be strategically weakened, for example, by thinning, to provide one or more deformable regions to create the necessary deformability that allows the compression nut to create the grip on the elongated support structure.

Referring now to the drawings, FIGS. 1A to 1F illustrate an exemplary adjustable clamping system 100 being applied to a jimmy bar 104 for the purpose of securing an accessory member 108 to the jimmy bar. In this example, accessory member 108 is in the form of a large washer that can act as both a fulcrum member to enhance the usability of jimmy bar 104 and as a stop that allows a worker to stow the jimmy bar in a tool belt (not shown). As seen in FIG. 1A, in this example, clamping system 100 includes a pair of friction sleeves 112(1) and 112(2) and a pair of compression nuts 116(1) and 116(2), one for each of the friction sleeves. In this example, each of compression nuts 116(1) and 116(2) has a passageway (not shown), respectively, so that each nut can be engaged with the shaft 104A, and a portion of each passageway has a frusto-conically shaped, i.e., tapered, threaded region (not shown) designed and configured to threadably engage a threaded region 112(1)A and 112(2)A on the corresponding friction sleeve 112(1) and 112(2). In this example, each threaded region 112(1)A and 112(2)A is a non-tapered, i.e., cylindrical, region. Each friction sleeve 112(1) and 112(2) has a deformable region (not illustrated) made deformable by slotting that friction sleeve to allow the friction sleeve to elastically deflect near the base of the slot region. As those skilled in the art will readily appreciate, the radial dimensions of the frusto-conically shaped threaded regions are selected so that when compression nuts 116(1) and 116(2) are increasingly threadingly engaged with friction sleeves 112(1) and 112(2), the deformation of the deformable regions increases so as to increase the clamping force of the friction sleeves on shaft 104A. In this example, each compression nut 116(1) and 116(2) includes a clamping face 116(1)A and 116(2)A for engaging, in this example, accessory member 108 when the accessory member is clamped in place using adjustable clamping system 100. Clamping faces 116(1)A and 116(2)A are located on corresponding respective flanges 116(1)B and 116(2)B of compression nuts 116(1) and 116(2).

Figure 1B:
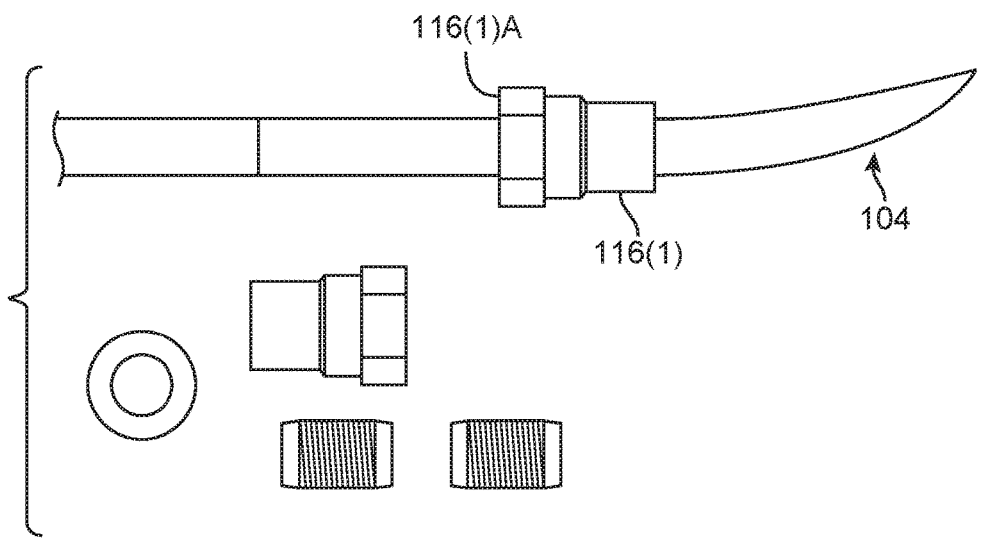
Figure 1C:
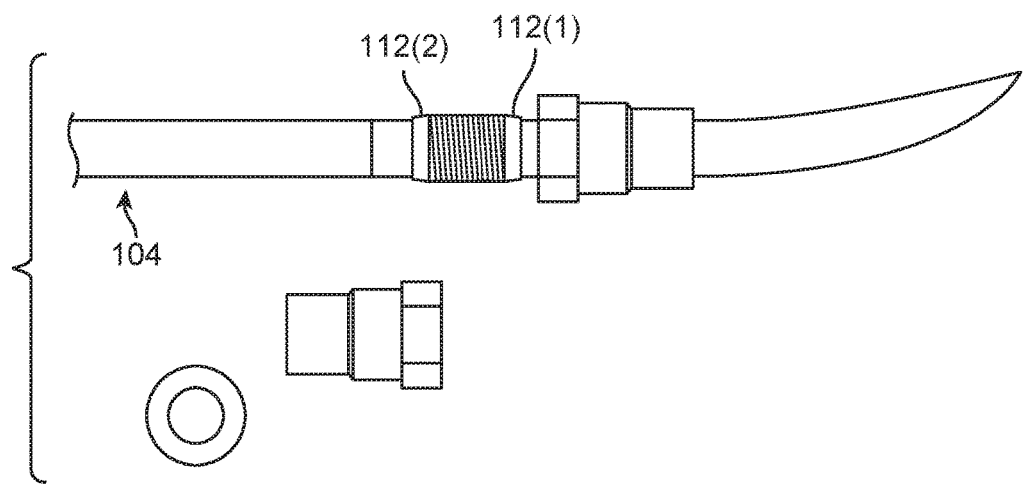
Figure 1D:
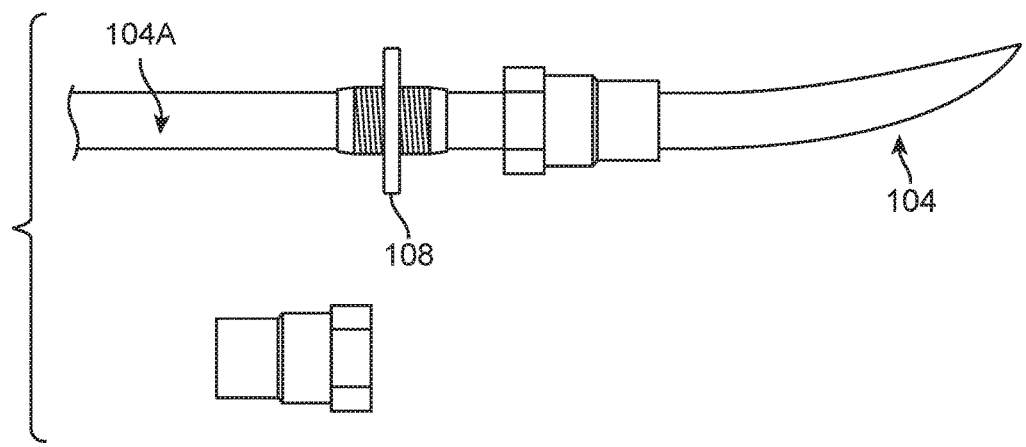
Figure 1E:
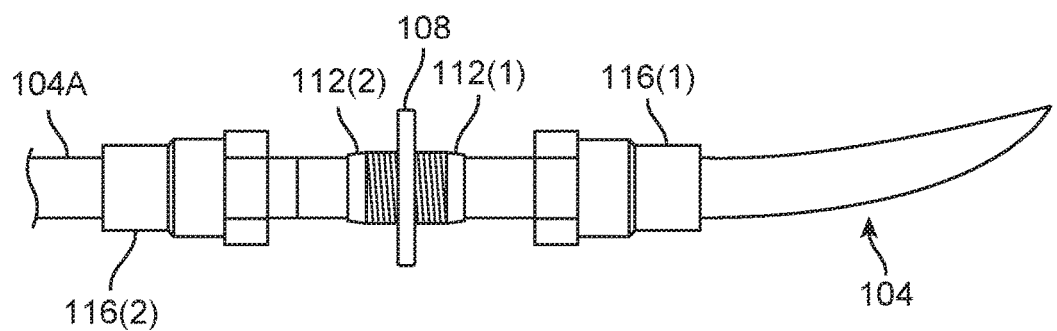
Figure 1F:
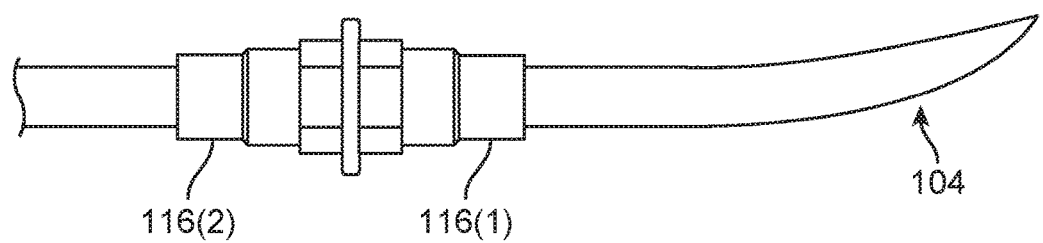

FIGS. 1A to 1F illustrate exemplary steps of engaging adjustable clamping system 100 and accessory member 108 to jimmy bar 104. As illustrated in FIG. 1B, the first step is to slide compression nut 116(1) onto jimmy bar 104 with clamping face 116(1)A facing to the left as shown. Then, as shown in FIG. 1C, friction sleeves 112(1) and 112(2) are slid onto jimmy bar 104 so that they contact one another, and then accessory member 108 is slid onto the assembly and positioned over the friction sleeves combination, as seen in FIG. 1D. It is noted that in this embodiment, accessory member 108 has a central opening 108A having a diameter that is slightly larger than the outside diameter of friction sleeves 112(1) and 112(2) such that the friction sleeves can contact one another. However, it is noted that in other embodiments, central opening 108A (FIG. 1A) can be smaller than the outside diameter of friction sleeves 112(1) and 112(2) (but larger than the diameter of shaft 104A of jimmy bar 104) such that the friction sleeves are installed to abut accessory member 108 on both sides of the accessory member. FIG. 1E illustrates all of the components of adjustable clamping system 100 and accessory member 108 engaged on shaft 104A of jimmy bar 104 but with compression nuts 116(1) and 116(2) not yet engaged with corresponding respective friction sleeves 112(1) and 112(2), and FIG. 1F shows the compression nuts fully threadedly engaged with the corresponding respective friction sleeves and clamping the accessory member between the compression nuts. Accessory member 108 is now firmly held in place by adjustable clamping system 100 and can be used, for example, as a fulcrum and/or stowage stop. Importantly, it is noted that a user can adjust the location of accessory member 108 along shaft 104A by simply loosening compression nuts 116(1) and 116(2) and sliding the components to the desired location and retightening the compression nuts. Those skilled in the art will readily appreciate that the exemplary method of installing adjustable clamp system 100 and accessory member 108 is merely exemplary and that the various steps, such as adding components and tightening compression nuts 116(1) and 116(2) can be performed in any logical order.

Figure 2A:
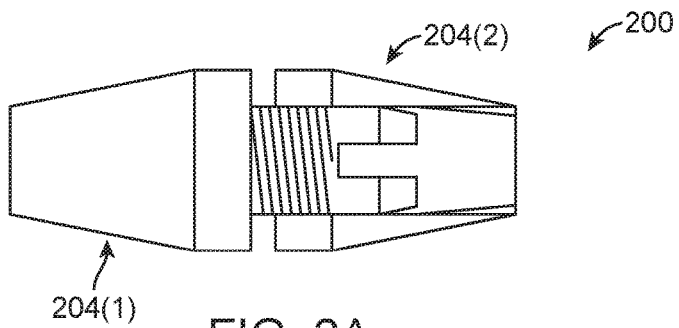
FIG. 2A is a partial exterior/partial cutaway side view of an alternative adjustable clamp system of the present invention.
Figure 2B:
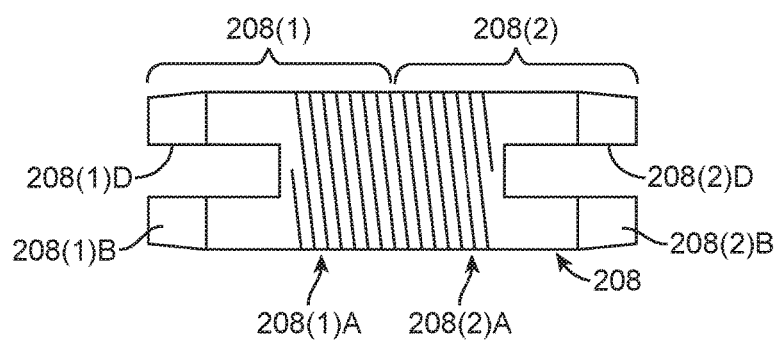
FIG. 2B is an enlarged side view of the friction sleeves of the adjustable clamp system of FIG. 2A that are combined into a unitary body.
Figure 2C:
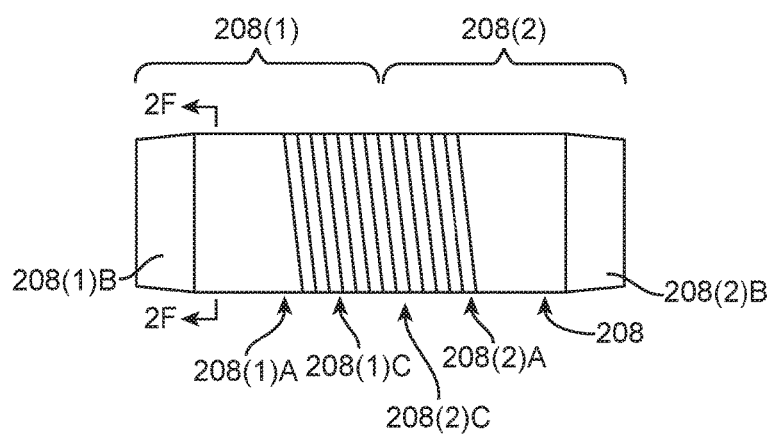
FIG. 2C is an enlarged side view of the unitary body of FIG. 2B rotated 90° along a longitudinal central axis of the unitary body.

FIG. 2A illustrates another adjustable clamp system 200 having a pair of compression nuts 204(1) and 204(2) and a pair of friction sleeves 208(1) and 208(2) (see FIG. 2B) integrated into a unitary body 208. Not illustrated, but which can be readily envisioned is how one or more objects can be clamped between compression nuts 204(1) and 204(2). FIGS. 2B and 2C illustrate unitary body 208 and friction sleeves 208(1) and 208(2) in more detail. As seen in FIGS. 2B and 2C, each friction sleeve 208(1) and 208(2) has a non-tapered threaded region 208(1)A and 208(2)A and a non-threaded frusto-conical, or tapered, region 208(1)B and 208(2)B for interacting with the corresponding compression nut 204(1) and 204(2) as described below. In this embodiment and as shown in FIG. 2B, each friction sleeve 208(1) and 208(2) has deformable regions 208(1)C and 208(2)C effected by a pair of slots 208(1)D and 208(2)D that weaken the structures to allow the corresponding compression nut 204(1) and 204(2) to move the free ends of that friction sleeve toward one another. In this case, the deformability of deformable regions 208(1)C and 208(2)C is bending, which is preferably elastic bending.

Figure 2D:
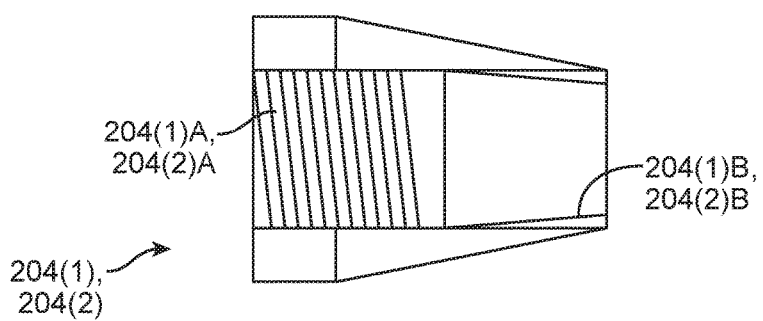
FIG. 2D is an enlarged cutaway view of each of the compression nuts of the adjustable clamp system of FIG. 2A.

FIG. 2D shows the configuration of each compression nut 204(1) and 204(2) (they are identical in this embodiment) in detail. Referring to FIG. 2D, each compression nut includes a non-tapered interior threaded region 204(1)A and 204(2)A and a frusto-conical region 204(1)B and 204(2)B. During use of adjustable clamp system 200 (FIG. 2A), threaded region 204(1)A and 204(2)A of each compression nut 204(1) and 204(2) engages the corresponding threaded region 208(1)A and 208(2)A (FIGS. 2B and 2C) of friction sleeve 208(1) and 208(2), and frusto-conical region 204(1)B and 204(2)B of the compression nut slidingly engages frusto-conical region 208(1)B and 208(2)B of the friction sleeve. As can be readily envisioned, when compression nuts 204(1) and 204(2) are properly engaged with friction sleeves 208(1) and 208(2) and the compression nuts are turned to advance the nut onto the sleeves, frusto-conical regions 204(1)B and 204(2)B of the nuts more and more firmly engage frusto-conical region 208(1)B and 208(2)B (FIGS. 2B and 2C) of the friction sleeves, pushing the free ends of the sleeve together. When adjustable clamp system 200 is properly engaged with a properly sized elongated structure (not shown), those skilled in the art can readily envision that this action causes the free ends of friction sleeves 208(1) and 208(2) to more firmly engage the elongated structure. It is noted that in alternative embodiments, threaded regions 204(1)A, 204(2)A, 208(1)A, and 208(2)A (FIGS. 2B and 2C) can be eliminated, with tapered regions 204(1)B, 204(2)B, 208(1)B, and 208(2)B being designed and configured to allow compression nuts 204(1) and 204(2) to simply slide along friction sleeves 208(1) and 208(2) in a manner that allows the corresponding respective tapered regions to interact and have enough friction with one another so that when the compression nuts are causing the friction sleeves to be forcefully engaged with the elongated structure, the compression nuts remain in place until a suitable external disengaging force breaks the friction between compression nuts and friction sleeves.

Figure 2E:
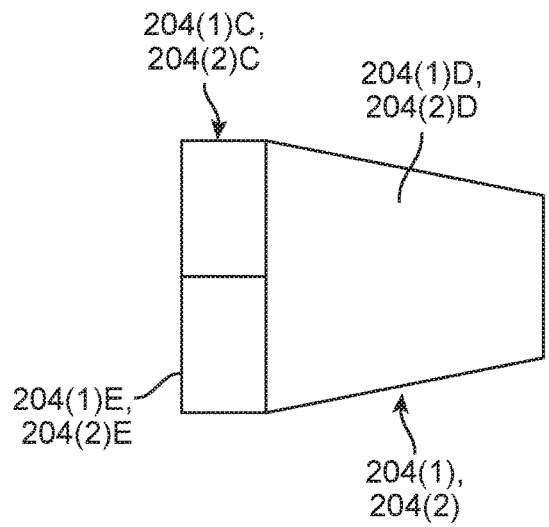
FIG. 2E is an enlarged exterior view of each of the compression nuts of the adjustable clamp system of FIG. 2A.

FIG. 2E shows the exterior of each compression nuts 204(1) and 204(2) as including a wrench-engaging region 204(1)C and 204(2)C and a tapered region 204(1)D and 204(2)D. It is noted that the exterior of compression nuts 204(1) and 204(2) can be configured in any other manner to accommodate particular design goals. For example, instead of wrench-engagable region 204(1)C and 204(2)C, each compression nut may have a knurled or other textured surface for allowing a user to turn the nut using her or his fingers. As another example, tapered region 204(1)D and 204(2)D may be replaced by another shape, such as a cylindrical region. In addition, it is noted that wrench-engaging region 204(1)C and 204(2)C could be provided on a flange (not shown). In the orientation shown in FIG. 2E, the left end of each compression nut 204(1) and 204(2) provides a clamping face 204(1)E and 204(2)E for engaging one or more objects to be clamped by adjustable clamping system 200.

Figure 2F:
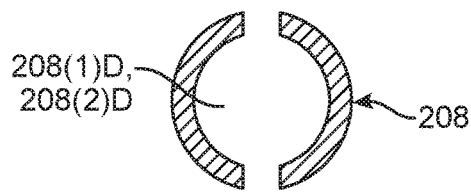
FIG. 2F is a cross-sectional view as taken along line 2F-2F of FIG. 2C.

FIG. 2F illustrates that body 208 (and therefore each friction sleeve 208(1) and 208(2) (FIGS. 2B and 2C)) has a circular passageway 208(1)D and 208(2)D for receiving an elongated structure (not shown) therethrough. In this example, the interior of each passageway 208(1)D and 208(2)D, at least at each friction sleeve 208(1) and 208(2) where it counts, includes a friction enhancer, here an elastomeric coating. Examples of other friction enhancers are noted above and could be used in the alternative. Each passageway 208(1)D and 208(2)D has an inside diameter that is suited for an elongated structure, e.g., cylindrical rod, bar, tube, pipe, etc., having an outside diameter just slightly larger than the inside diameter of the passageways to allow body 208 to be installed onto the elongated structure and moved relative thereto to a desired location on the elongated structure and also to allow the deformation of the friction sleeve 208(1) and 208(2) caused by corresponding compression nut 204(1) and 204(2) to move one or more portions of that friction sleeve into firm compressive engagement with the supporting structure.

Figure 3:
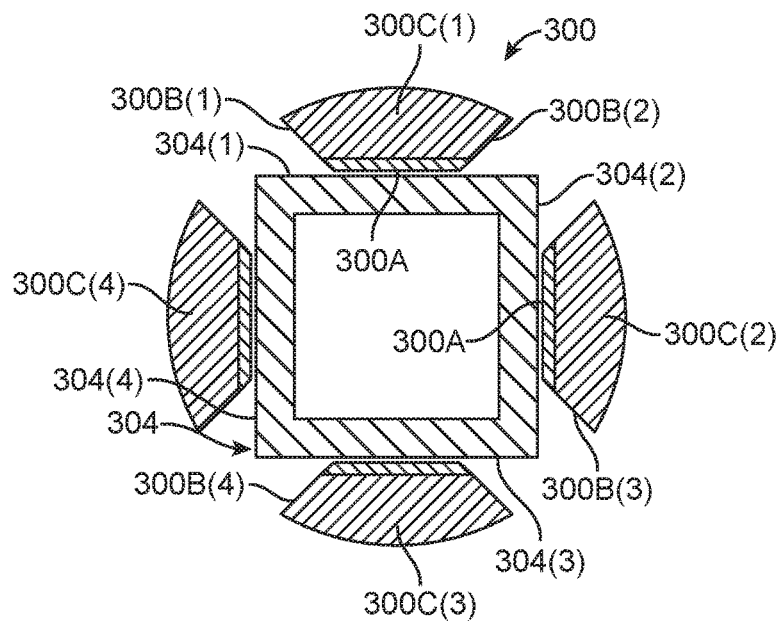
FIG. 3 is a cross-sectional view of an exemplary alternative friction sleeve shown engaged with a rectangular bar.

As noted above, the elongated structure with which an adjustable clamping system of the present disclosure can be used does not need to be cylindrical. FIG. 3 illustrates an exemplary friction sleeve 300 for an elongated structure 304 having a non-cylindrical shape. In this example, elongated structure 304 has a rectangular cross-sectional shape, and friction sleeve 300 is designed and configured to accommodate that shape. In the embodiment shown, friction sleeve 300 accommodates the rectangular cross-sectional shape of elongated structure 304 by having a rectangular passageway 300A, with the deformability being effected by four slots 300B(1) to 300B(4). As can be appreciated, this essentially provides a cantilevered (into and out of the page of FIG. 3) portion 300C(1) to 300C(4) for each of the four faces 304(1) to 304(4) of elongated structure 304 that is forced into engagement with that face during use.

Figure 4:
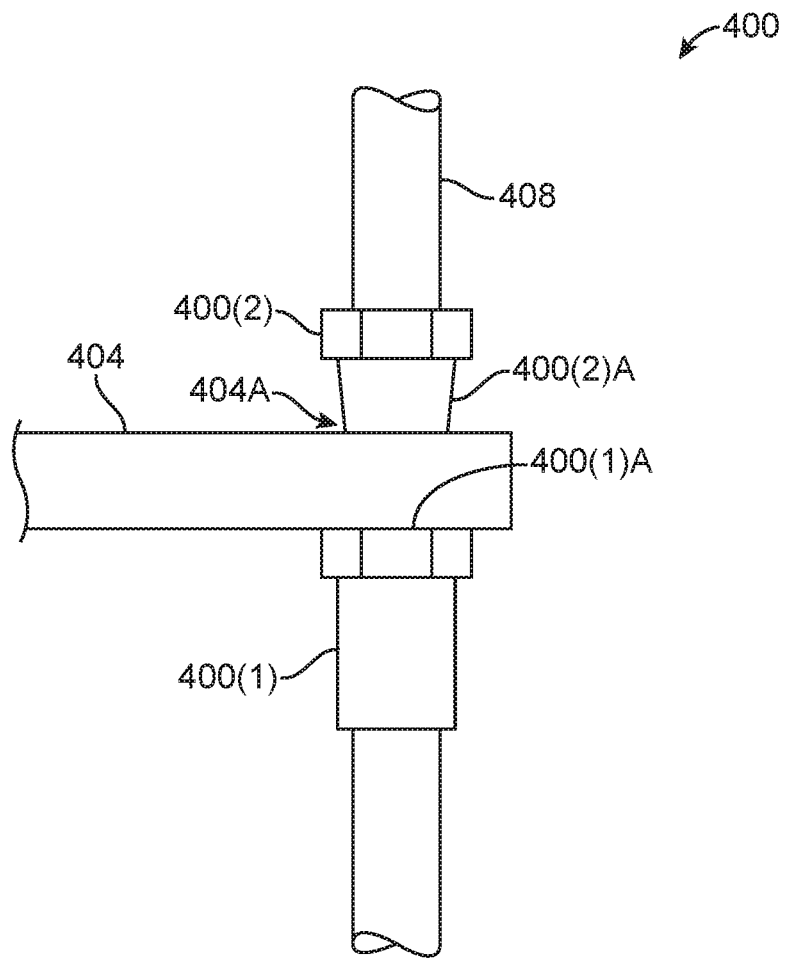
FIG. 4 is a partial view of a shelving system in which an adjustable clamping system of the present invention is deployed to secure a shelf to a vertical support member.

FIG. 4 illustrates an adjustable clamping system 400 made in accordance with the present invention used for supporting a shelf 404 on a support member 408. In this example, adjustable clamping system 400 is particularly adapted for use as a shelf support, with a lower compression nut 400(1) being configured to provide vertical support to shelf 404 and an upper compression nut 400(2) being configured to cooperate with an opening 404A within the shelf to clamp the shelf into firm engagement with a clamping face 400(1)A of the lower compression nut and, by virtue of its frusto-conical clamping face 400(2)A, center support member 408 within the opening in the shelf. In addition, having shelf 404 firmly clamped to support member 408 can provide stability to the overall system, especially when the installation is part of, for example, a freestanding shelving unit that otherwise does not include any X-bracing or other lateral support.

In this example, each of compression nuts 400(1) and 400(2) is an internally threaded compression nut that works in the manner described above to radially compress corresponding respective externally threaded friction sleeves (not shown), which can be either separate sleeves or combined into a unified body, such as in the manner described above relative to unified sleeve body 208. One, the other, or both of the friction sleeves may include a friction-enhancer for engaging support member, such as a rubberized coating. A friction enhancer can be especially useful on the lower friction sleeve that is compressed by lower compression nut 400(1) because of the weight from shelf 404 and the objects (not shown) the shelf may be supporting.

Figure 5:
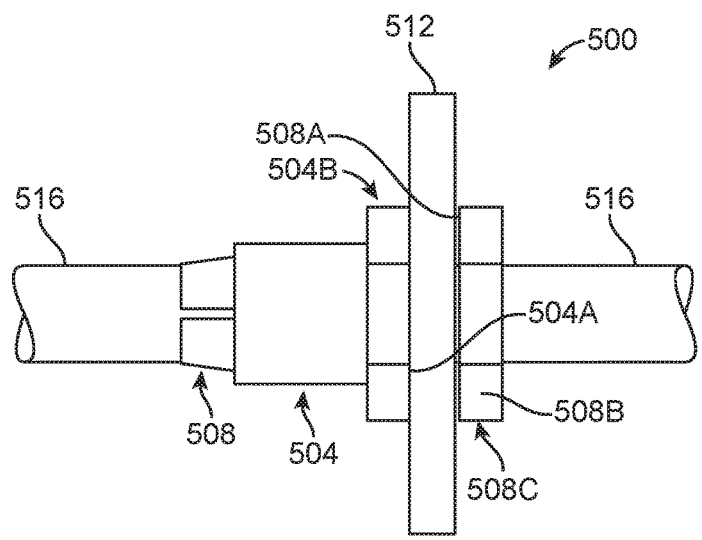
FIG. 5 is an exterior view of another embodiment of an adjustable clamp system of the present invention having a single compression nut and a friction sleeve that provides one of a pair of clamping faces, showing the adjustable clamp system engaged on a rod and holding an object.

FIG. 5 illustrates another exemplary adjustable clamp system 500 made in accordance with the present invention. In this embodiment, adjustable clamp system 500 includes a single compression nut 504 and a single friction sleeve 508, wherein the compression nut provides a first clamping face 504A and the friction sleeve has a flange 508A that provides a second clamping face 508B. Thus, an object desired to be supported, such as object 512, is clamped between compression nut 504 and flange 508A of friction sleeve 508. This embodiment is simple in that it requires only two components and is readily repositionable on an elongated support structure, such as rod 516, by loosening and tightening only a single compression nut, i.e., compression nut 504. In the embodiment shown, each of compression nut 504 and flange 508A of friction sleeve 508 is provided with a hex-nut configuration 504B and 508C to assist tightening of the compression nut if needed. In other embodiments, hex-nut configurations 504B and 508C can be supplemented or replaced by one or more other means for assisting tightening of the nut, such as a wing-nut configuration, knurling, or other grip-enhancing structure. It is noted that aspects and features of compression nut 504 and friction sleeve 508 not particularly described, such as interior and exterior configurations of the compression nut and friction sleeve and the presence of any friction enhancers on the friction sleeve, can be the same or similar to aspects described elsewhere herein.

Figure 6:
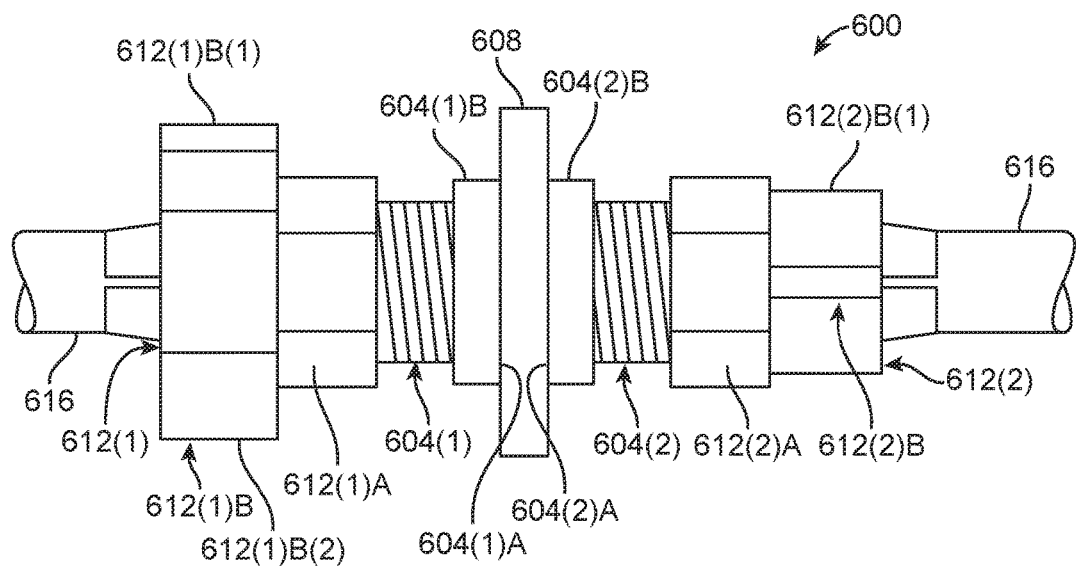
FIG. 6 is an exterior view of yet another embodiment of an adjustable clamp system of the present invention having a pair of friction sleeves providing a pair of clamping faces, showing the adjustable clamp system engaged on a rod and holding an object.

FIG. 6 illustrates yet another exemplary adjustable clamp system 600 made in accordance with the present invention. In this embodiment, adjustable clamp system 600 includes a pair of separate friction sleeves 604(1) and 604(2) that provide a pair of clamping faces 604(1)A and 604(2)A between which an object, such as object 608 can be clamped during use of the clamping system. Each friction sleeve 604(1) and 604(2) is engaged by a corresponding compression nut 612(1) and 612(2) that, in this embodiment, is threadably engaged with that friction sleeve so as to press a portion of the friction sleeve into firm contact with an elongated structure, such as rod 616 to firmly clamp object 608 in place. A benefit of clamping system 600 is that any size object can be accommodated, since compression nuts 612(1) and 612(2) only serve one purpose of deforming friction sleeves 604(1) and 604(2) so that they firmly grip support rod 616. In other embodiments described herein, at least one compression nut provides the dual function of providing a clamping face and deforming a friction sleeve, which in some cases can limit the size of the object that can be accommodated (see, e.g., adjustable clamp system 200 of FIGS. 2A to 2F) and in other cases can lead to the need to play around with the location of one friction sleeve relative to a separate friction sleeve to achieve an optimal result (see, e.g., adjustable clamp system 100 of FIGS. 1A to 1F. In the embodiment shown, clamping faces 604(1)A and 604(2)A are defined by corresponding respective flanges 604(1)B and 604(2)B, which may or may not be continuous around the entire circumference of friction sleeves 604(1) and 604(2).

In the illustrated embodiment, each nut is provided with two means for assisting a user in tightening compression nuts 612(1) and 612(2). The first feature is a hex-nut configuration 612(1)A, 612(2)A, and the second feature is a wing-nut configuration 612(1)B, 612(2)B. Each wing-nut configuration 612(1)B and 612(2)B is defined by a pair of wings 612(1)B(1), 612(1)B(2), and 612(2)B(1) (only one of the pair is visible on compression nut 612(2) due to the illustrated rotational orientation of that nut). It is noted that aspects and features of compression nuts 612(1) and 612(2) and friction sleeves 604(1) and 604(2) not particularly described, such as interior and exterior configurations of the compression nut and friction sleeve and the presence of any friction enhancers on the friction sleeve, can be the same or similar to aspects described elsewhere herein.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A jimmy bar assembly, comprising:
   a jimmy bar having first and second ends and a shaft extending between said first and second ends, said shaft having a longitudinal axis;
   a fulcrum assembly engaged with said shaft so as to be movable by a user along said shaft and to be lockable by the user into any of a plurality of locations along said longitudinal axis of said shaft, said fulcrum assembly including:
      a clamp assembly that includes:
         a first friction sleeve comprising:
            a first passageway receiving therein said shaft so that said first friction sleeve is slidable along said shaft; and
            a first deformable region designed and configured to deform so as to allow said first friction sleeve to firmly frictionally engage said shaft when said fulcrum assembly is locked in one of the plurality of locations along said shaft;
         a first compression nut designed and configured to engage said first friction sleeve so as to deform said first deformable region so that said first friction sleeve firmly frictionally engages said shaft when said fulcrum assembly is locked in one of the plurality of locations along said shaft, said first compression nut including a first clamping face, wherein at least one of said first deformable region and said first compression nut includes a tapered region that effects deformation of said first deformable region as the user advances said first compression nut onto said first friction sleeve; and
         a second clamping face opposed to said first clamping face and spaced relative to said first clamping face in a direction parallel to said longitudinal axis of said shaft; and
      a fulcrum member clamped between the first and second clamping faces and extending radially, relative to said longitudinal axis, beyond each of said first and second clamping faces so as to provide a fulcrum point for the jimmy bar assembly.

2. The jimmy bar assembly according to claim 1, wherein said clamp assembly further comprises:
   a second friction sleeve that includes:
      a second passageway receiving therein said shaft of said jimmy bar so that said second friction sleeve is slidable along said longitudinal axis of said shaft; and
      a second deformable region designed and configured to deform so as to allow said second friction sleeve to firmly frictionally engage said shaft when said fulcrum assembly is locked in one of the plurality of locations along said shaft; and
   a second compression nut designed and configured to engage said second friction sleeve so as to deform said second deformable region so that the second friction sleeve firmly frictionally engages said shaft when said fulcrum assembly is locked in one of the plurality of locations along said shaft, said second compression nut includes the second clamping face, wherein at least one of said second deformable region and said second compression nut includes a tapered region that effects deformation of said second deformable region as the user advances said second compression nut onto said second friction sleeve.

3. The jimmy bar assembly according to claim 2, wherein said first and second friction sleeves are joined with one another as a unitary body.

4. The jimmy bar assembly according to claim 1, wherein said second clamping face remains fixedly coupled to said first friction sleeve after manufacture.

5. The jimmy bar assembly according to claim 1, wherein said first compression nut threadingly engages said first friction sleeve.

6. The jimmy bar assembly according to claim 5, wherein said first compression nut has a tapered threaded region and said first friction sleeve has a non-tapered threaded region, wherein said tapered threaded region is designed and configured to threadingly engage said non-tapered threaded region so as to deform said first deformable region.

7. The jimmy bar assembly according to claim 5, wherein said first compression nut has a non-tapered threaded region and said first friction sleeve has a tapered threaded region, wherein said non-tapered threaded region is designed and configured to threadingly engage said tapered threaded region so as to deform said first deformable region.

8. The jimmy bar assembly according to claim 1, wherein said first compression nut is slidingly and frictionally engageable with said first friction sleeve.

9. The jimmy bar assembly according to claim 1, wherein said first compression nut includes a flange and at least a portion of said first clamping face is on said flange.

10. The jimmy bar assembly according to claim 1, wherein said first friction sleeve includes a flange and at least a portion of said first clamping face is on said flange.

11. The jimmy bar assembly according to claim 2, wherein said shaft has a non-circular transverse cross-sectional shape and each of said first and second passageways has a non-cylindrical transverse cross-sectional shape to conform to the non-circular transverse cross-sectional shape of said shaft.

12. The jimmy bar assembly according to claim 11, wherein said shaft has a rectangular transverse cross-sectional shape and each of said first and second passageways has a rectangular transverse cross-sectional shape to conform to the rectangular transverse cross-sectional shape of said shaft.

13. The jimmy bar assembly according to claim 1, wherein the first friction sleeve further comprises a friction enhancer located within said first passageway so as to engage said shaft when said fulcrum assembly is locked in one of the plurality of locations along said shaft.

14. The jimmy bar assembly according to claim 13, wherein said friction enhancer comprises surface textures on said first friction sleeve within said first passageway.

15. The jimmy bar assembly according to claim 13, wherein said friction enhancer comprises a friction-enhancing structure secured to said first friction sleeve.

16. The jimmy bar assembly according to claim 15, wherein said friction-enhancing structure comprises a layer of friction-enhancing material.

17. The jimmy bar assembly according to claim 1, wherein said fulcrum member comprises a washer.

18. A method, comprising:
providing a fulcrum assembly designed and configured to be installed on a jimmy bar having first and second ends and a shaft extending between the first and second ends, the shaft having a longitudinal axis, wherein the fulcrum assembly is engageable with the shaft so as to be movable by a user along the shaft and to be lockable by the user into any of a plurality of locations along the longitudinal axis of the shaft, the fulcrum assembly including:
a clamp assembly that includes:
a first friction sleeve comprising:
a first passageway that, when the fulcrum assembly is engaged with the jimmy bar, receives therein the shaft of the jimmy bar so that the first friction sleeve is slidable along the shaft; and
a first deformable region designed and configured to deform so as to allow the first friction sleeve to firmly frictionally engage the shaft when the fulcrum assembly is locked in one of the plurality of locations along the shaft;
a first compression nut designed and configured to engage the first friction sleeve so as to deform the first deformable region so that the first friction sleeve firmly frictionally engages the shaft when the fulcrum assembly is locked in one of the plurality of locations along the shaft, the first compression nut including a first clamping face, wherein at least one of the first deformable region and the first compression nut includes a tapered region that effects deformation of the first deformable region as the user advances the first compression nut onto the first friction sleeve; and
a second clamping face opposed to the first clamping face and spaced relative to the first clamping face in a direction parallel to the longitudinal axis of the shaft; and
a fulcrum member for clamping between the first and second clamping faces and, when the fulcrum assembly is properly engaged with the shaft of the jimmy bar, extending radially, relative to the longitudinal axis of the shaft, beyond each of the first and second clamping faces so as to provide a fulcrum point for the jimmy bar; and
instructing a user to engage the fulcrum assembly with the shaft of the jimmy bar so that the fulcrum member is firmly clamped between the first and second clamping faces and the friction sleeve is firmly engaged with the shaft of the jimmy bar.

19. The method according to claim 18, further comprising instructing the user to adjust a location of the fulcrum assembly along the shaft and to lock the fulcrum assembly into a desired location along the shaft.

20. The method according to claim 18, wherein the clamp assembly further comprises:
a second friction sleeve that includes:
a second passageway that, when the fulcrum assembly is engaged with the jimmy bar, receives therein the shaft of the jimmy bar so that the second friction sleeve is slidable along the longitudinal axis of the shaft; and
a second deformable region designed and configured to deform so as to allow the second friction sleeve to firmly frictionally engage the shaft when the fulcrum assembly is locked in one of the plurality of locations along the shaft; and
a second compression nut designed and configured to engage the second friction sleeve so as to deform the second deformable region so that the second friction sleeve firmly frictionally engages the shaft when the fulcrum assembly is locked in one of the plurality of locations along the shaft, the second compression nut includes the second clamping face, wherein at least one of the second deformable region and the second compression nut includes a tapered region that effects deformation of the second deformable region as the user advances the second compression nut onto the second friction sleeve.

* * * * *